US009658932B2

(12) United States Patent
Heikinheimo et al.

(10) Patent No.: US 9,658,932 B2
(45) Date of Patent: May 23, 2017

(54) LIGHTWEIGHT FUNCTIONAL TESTING

(71) Applicant: ROVIO ENTERTAINMENT LTD., Espoo (FI)

(72) Inventors: Hannes Heikinheimo, Espoo (FI); Esko Suomi, Espoo (FI); Behrouz Derakhshan, Espoo (FI)

(73) Assignee: ROVIO ENTERTAINMENT LTD., Espoo (FI)

( * ) Notice: Subject to any disclaimer, the term of this patent is extended or adjusted under 35 U.S.C. 154(b) by 122 days.

(21) Appl. No.: 14/631,089

(22) Filed: Feb. 25, 2015

(65) Prior Publication Data

US 2016/0246695 A1    Aug. 25, 2016

(51) Int. Cl.
*G06F 11/26*    (2006.01)
*G06F 11/277*   (2006.01)
*G06F 11/273*   (2006.01)
*G06F 11/263*   (2006.01)

(52) U.S. Cl.
CPC .......... *G06F 11/261* (2013.01); *G06F 11/263* (2013.01); *G06F 11/277* (2013.01); *G06F 11/2736* (2013.01)

(58) Field of Classification Search
CPC ... G06F 11/263; G06F 11/2736; G06F 11/277
See application file for complete search history.

(56) References Cited

U.S. PATENT DOCUMENTS

| | | | | |
|---|---|---|---|---|
| 9,329,962 | B2 * | 5/2016 | Salame | G06F 11/263 |
| 2009/0262743 | A1 * | 10/2009 | Uyehara | H04L 43/08 370/394 |
| 2009/0310491 | A1 * | 12/2009 | Ginsberg | H04L 12/2697 370/241 |
| 2010/0275062 | A1 * | 10/2010 | Ur | G06F 11/263 714/32 |
| 2014/0282421 | A1 | 9/2014 | Jubran et al. | |
| 2015/0278060 | A1 * | 10/2015 | He | G06F 11/263 714/37 |

FOREIGN PATENT DOCUMENTS

EP    2477356 A1    7/2012

* cited by examiner

*Primary Examiner* — Yolanda L Wilson
(74) *Attorney, Agent, or Firm* — Squire Patton Boggs (US) LLP

(57) ABSTRACT

The present invention relates to a method performing a method for functional testing of a data collection system and at least one non-transitory computer-readable memory containing computer readable instructions for implementing this method. The method includes periodically sending by the message simulator to the data collection system running in production environment, batches of sets of messages, where the messages mimic normal client messages. Each message contains a batch identification common to the messages within the specific batch and a unique message counter value. The batch of messages received by the data collection system is checked in the verification service to verify whether the data collection systems operates correctly.

20 Claims, 4 Drawing Sheets

LIGHTWEIGHT FUNCTIONAL TESTING

BACKGROUND

Field

The present invention relates to data collection systems and especially to methods for functional testing of a data-collection system. The present invention further relates to at least one non-transitory computer-readable memory that contains computer readable instructions implementing various methods of testing of a data collection system.

Description of the Related Art

FIG. 1 presents a schematic presentation of an exemplary data collection system. This is a cloud computing system, which has multiple nodes handling same tasks, where the system load is shared between a number of nodes, and the number of nodes serving each task is adjusted flexibly and continuously according to capacity needs. The number and identity of the actual nodes serving the clients is not visible to the clients. This is shown in the figure by presenting a number of nodes for each functionality, some of which are marked with dashed line.

Client messages from a large number of clients 150 are first received by collector node(s) 101, which collect the messages and may also compress collected data before forwarding it to elastic buffer(s) 102 for temporary storage. Again, the elastic buffer 102 is actually a set of nodes, which can be adjusted in elastic manner, matching the resources provided according to the amount of data to be buffered or stored. An example of an elastic buffer service is Kafka®, which is an open source project. Data streams can be partitioned and spread over a cluster of nodes to enable handling of large data streams. Elastic buffers 102 may further provide persistence by storing the data on disks and providing replication for data back-up.

Data is processed in yet another elastic cluster of nodes called elastic data processing 103, specialized in processing vast amounts of data. This kind of processing cluster may be used for a variety of applications, such as log analysis, machine learning, financial analysis, scientific simulation and so on. The cluster used by a specific customer or specific service may again be resized according to current need. An example of elastic data processing is for example Amazon EMR® service.

Functionality of a cloud computing service can be tested in various ways. Examples of different testing types are stress test, load and performance test, compatibility test, latency test, browser performance test and functional test. Functional test is typically used for an individual component or software in a system, and the purpose of the functional testing is to assure quality of the component under test. Test is typically of black box type: test cases are created based on the specifications of the item under test, and function is tested by feeding input according to the specifications, and examining the output.

US patent application US2014282421 presents a method for validating a software product in a distributed computing infrastructure. The testing scheme is rather heavy, and it requires configuring plurality of virtual machines within the computing infrastructure to complete the testing.

Known test arrangements for systems are heavy and they either cannot be used in the normal production environment or they tend to disturb the normal traffic by causing exceptional load in the system or in some parts of the system.

SUMMARY

An object of the present invention is to provide a method and at least one non-transitory computer-readable memory that contains computer readable instructions to perform a method in apparatuses so as to overcome the prior art disadvantages.

Aim of current invention is to establish a lightweight functional test for the entire data collection system residing in a could computing system, which periodically verifies correct functioning of the entire data collection system in the actual production environment as seen by a client, but does not cause heavy load to any individual part of the system. As long as the functional test indicates that the system operates normally in the production environment, there is no need for more specific and resource consuming testing.

The embodiments of the invention are disclosed in the dependent claims.

The present invention is based on the idea of introducing a light weight functional testing device, method and a non-transitory computer-readable memory that contains computer readable instructions for periodically testing the data collection system, mimicking a normal message producing client.

The present invention has the advantage that it enables receiving an indication of functionality of the data collection system during normal operation, and the testing can be executed periodically to follow up continuous operation of the system. On the other hand the verification system may detect early any problems in the data collection system and it provides a measurable, verifiable, repeatable, reliable and statistically sound system, which may further be helpful when trying to solve problems detected in a live service system.

According to a first aspect, a method for functional testing of a data collection system is provided, the method including periodically sending to the data collection system sets of messages, each set including a first predefined number of messages, and periodically sending to the data collection system a batch of said sets, the batch including a second predefined number of said sets.

According to a second aspect, the method further includes sending the sets of messages in first predefined intervals and sending the batches of said sets in second predefined intervals, wherein the second predefined interval is longer than the first predefined interval.

According to a third aspect, each of said messages contain a batch identification common to the messages within the specific batch and a unique message counter value.

According to a fourth aspect, the batch identification and the unique message counter value are placed in each message as metadata.

According to a fifth aspect, the method further includes sending the messages to the data collection system through a standard client interface, while the data collection system operates in production environment.

According to a sixth aspect, the method further includes receiving, through a configuration interface, a set of configuration data defining: number of messages per batch, periodicity of sending consecutive messages, number of batches per set and periodicity of sending consecutive batches.

According to a seventh aspect, the method further includes receiving a new set of configuration data, and if a batch is currently being sent to the data collection system, waiting until current batch has been sent, and sending next batch of messages with the new set of configuration data.

According to an eighth aspect, the method further includes obtaining periodically, from the data collection system, a batch of messages, each message including a common batch identification and a unique message counter value and verifying the validity of the obtained batch of messages.

According to a ninth aspect, said verifying includes checking, based on the common batch identification and the message counter values in all received messages in the obtained batch of messages, whether a single instance of each message has been received by the data collection system, and if any of the messages in the obtained batch of messages is found missing, duplicated or corrupted, initiating a warning.

According to a tenth aspect, the method further includes storing the obtained batch of messages for further use and utilizing stored batches of messages for visualizing the reliability of the data collection system.

According to an aspect of invention, a non-transitory computer-readable memory is provided that contains computer readable instructions which, when executed by at least one data processor configured to operate as a message simulator cause periodically sending to the data collection system sets of messages, each set including a first predefined number of messages, and periodically sending to the data collection system a batch of said sets, the batch including a second predefined number of said sets.

According to a second aspect, a non-transitory computer-readable memory is provided that contains computer readable instructions which, when executed by at least one data processor configured to causes sending said sets of messages in first predefined intervals, and sending said batches of said sets in second predefined intervals, wherein the second predefined interval is longer than the first predefined interval.

According to a third aspect a non-transitory computer-readable memory is provided that contains computer readable instructions which, when executed by at least one data processor configured to causes including in each of said messages a batch identification common to the messages within the specific batch and a unique message counter value.

According to a fourth aspect, a non-transitory computer-readable memory is provided that contains computer readable instructions which, when executed by at least one data processor configured to causes the batch identification and the unique message counter value to be included in each message as metadata.

According to a fifth aspect, non-transitory computer-readable memory is provided that contains computer readable instructions which, when executed by at least one data processor configured to causes sending the messages into the data collection system through a standard client interface, while the data collection system operates in production environment.

According to a sixth aspect, a non-transitory computer-readable memory is provided that contains computer readable instructions which, when executed by at least one data processor configured to causes receiving, through a configuration interface, a set of configuration data defining: number of messages per batch, periodicity of sending consecutive messages, number of batches per set and periodicity of sending consecutive batches.

According to a seventh aspect, a non-transitory computer-readable memory is provided that contains computer readable instructions which, when executed by at least one data processor configured to causes receiving a new set of configuration data, and if a batch is currently being sent to the data collection system, waiting until current batch has been sent, and sending next batch of messages with the new set of configuration data.

According to an eighth aspect, a non-transitory computer-readable memory is provided that contains computer readable instructions which, when executed by at least one data processor configured to execute a verification service causes obtaining periodically, from the data collection system, a batch of messages, each message including a common batch identification and a unique message counter value and verifying the validity of the received batch of messages.

According to a ninth aspect, a non-transitory computer-readable memory is provided that contains computer readable instructions which, when executed by at least one data processor configured to execute a verification service causes checking, based on the common batch identification and the message counter values in all messages in the obtained batch of messages, whether a single instance of each message has been received by the data collection system and if any of the messages in the obtained batch of messages is found missing, duplicated or corrupted, initiating a warning.

According to a tenth aspect, a non-transitory computer-readable memory is provided that contains computer readable instructions which, when executed by at least one data processor configured to execute a verification service causes storing the obtained batch of messages for further use and utilizing stored batches of messages for visualizing the reliability of the data collection system.

BRIEF DESCRIPTION OF THE DRAWINGS

In the following the invention will be described in greater detail, in connection with embodiments, with reference to the attached drawings, in which.

DETAILED DESCRIPTION

The following embodiments are exemplary only. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with an example of a system architecture in which various embodiments of the invention may be implemented. Only elements relevant for illustrating the embodiments are described. Various implementations of the information system include elements that are suitable for the example embodiments and may not be specifically described herein.

As used herein, the terms "virtual server", "server", "node" and "host" refer to a physical or virtual computational entity capable of enhancing information and to perform computational tasks. The term server or host may refer to one entity or a group on entities configured to operate jointly.

"Client" refers to any computing device using an application or service available in the production environment and producing messages and/or data to the application or service operated in the production environment and/or to the data collection system operating in a production environment.

"Production environment" refers to any computing environment where the application programs are available for clients. This may be a single computer, a computer network or a computing could. The computer may include one or more virtual servers and the computer network or computing cloud may include one or more physical servers and/or one or more virtual servers.

"Data collection system" refers to a system operating/running in a production environment collecting data related to the clients. The data collection system may include a database specialized in or configured for collecting data. Data collection systems may be commercial services available in the cloud computing environment.

Terms "messages" and "events" may be used interchangeably, as they essentially mean the same thing in the context of this description. A transaction includes a number of messages/events.

"Simultaneously" may refer to occurrence of events, such as sending of messages, in parallel or in serial manner, or in a combination of these, depending on the capabilities of the device causing the occurrence of the events. Parallel manner indicates that events occur essentially at same time, and serial manner indicates that at least some of the events occur just after each other.

Figure 1:
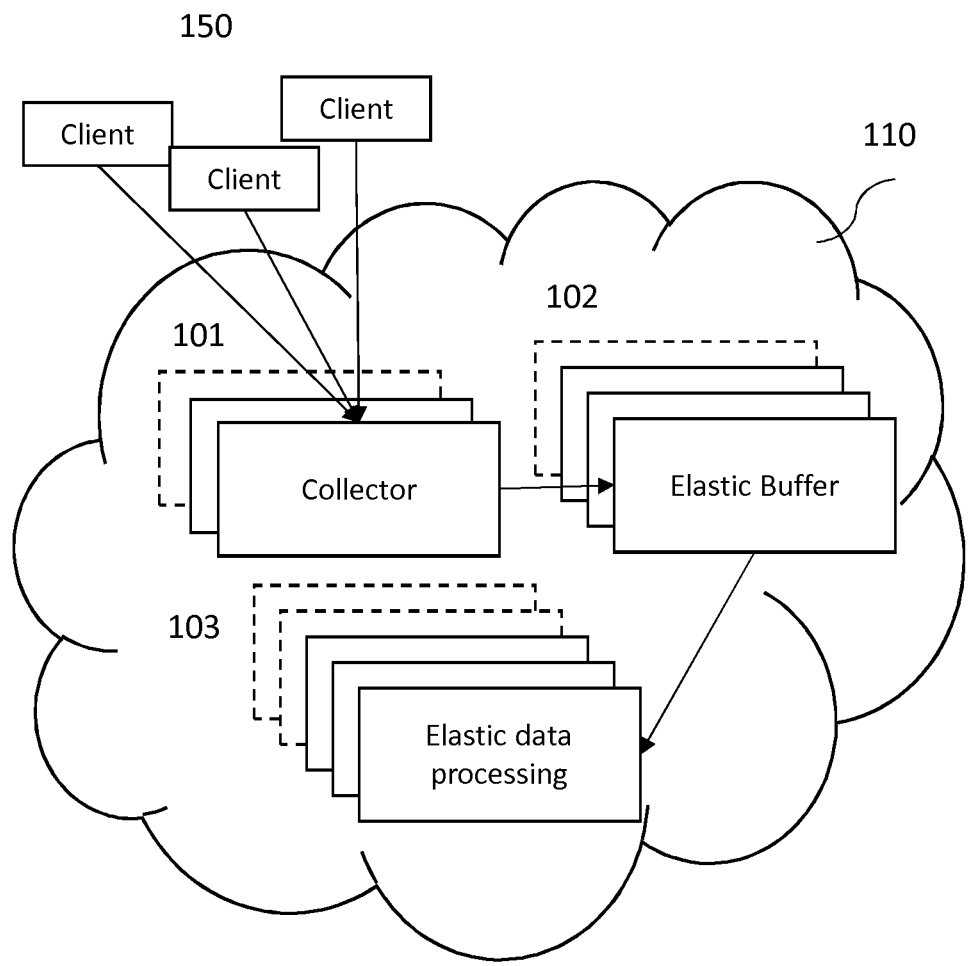
FIG. 1 is a schematic presentation of a data collection system.
Figure 2:
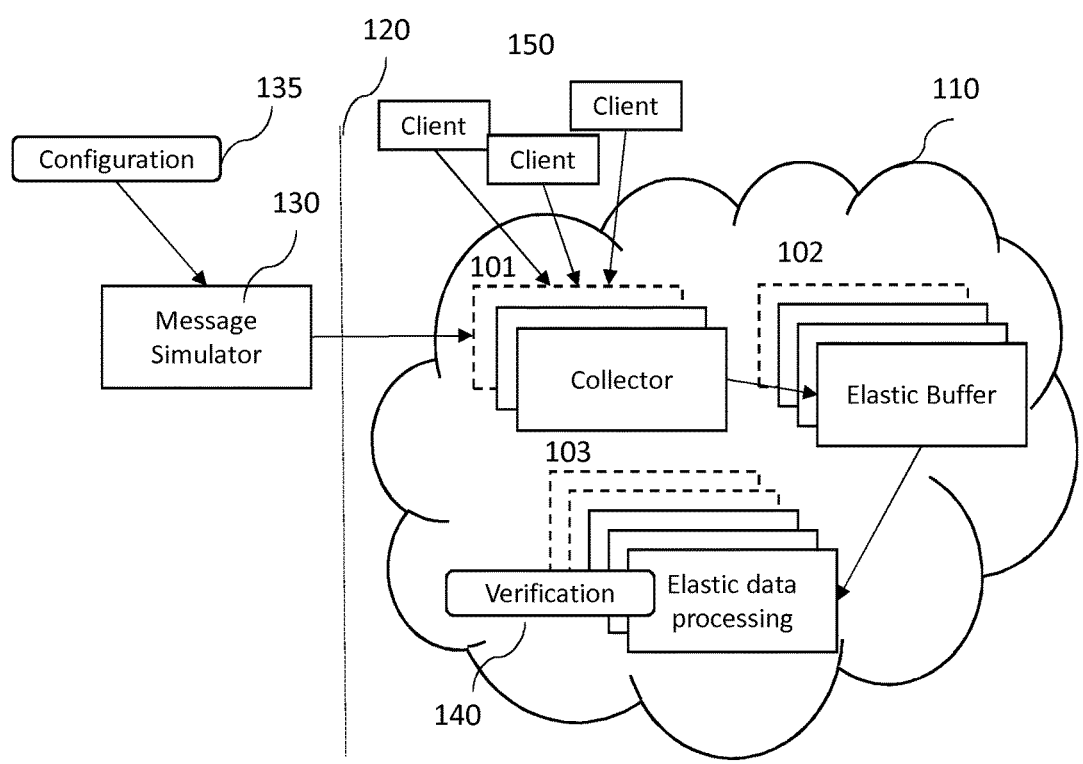
FIG. 2 shows a schematic presentation of an exemplary data collection system in a production environment with a message simulator and verification functionality.

FIG. 2 shows the schematic presentation of an exemplary data collection system in a production environment with a message simulator and verification functionality. Vertical dashed line 120 indicates an exemplary, but not necessary division of the system to parts in the production environment (to the right), representing the data collection system 110 in and the parts working in private computing environment (to the left). The basic setup of the exemplary data collection system in a production environment is similar to FIG. 1, and will not be repeated here.

The message simulator 130 is a node or a software running in a node autonomously. It sends a preset amount of messages towards the data collection system 110 in production environment, mimicking a normal client node. In view of the functional testing, the data collection system is considered as a "black box". A collector 101 is discovered by the message simulator 130 through normal DNS routing similarly as any of clients 150 would discover the collector 101. The message simulator 130 doesn't have any information on the additional functional details or resources available in the data collection system 110 other than knowledge of the interface through which the messages are sent in and the address it receives through DNS discovery. Data collection system receives messages from the message simulator through a normal client interface, and it has no information of the special use of these messages, but handles these like any other client communication. Thus, the message simulator appears to the data collection system 110 as a normal client. From data collection system 110 point of view, the message simulator 130 may therefore also be called as a client emulator. Messages sent by the message simulator 130 are collected, buffered and provided for data processing in the data collection system 110 as described in relation to FIG. 1.

The message simulator 130 is configured using a configuration API (application programming interface) 135. According to an embodiment the parameters configured through the configuration API 135 are at least:
batch size: total number of messages per batch
batch period: timely spacing between consecutive batches
set size: the number of messages per set
set period: timely spacing between consecutive sets The naming of the parameters used in this example should not be understood in a limiting way. We have chosen here to use a naming convention where a batch includes a number of sets, which include a preset number of messages that are sent simultaneously. The number of sets in a batch may be calculated by dividing the number of messages in a batch with the number of messages per set. The terminology may vary without departing from the scope of the claims.

According to another embodiment the parameters configured through the configuration API 135 are at least:
batch size: total number of sets per batch
batch period: timely spacing between consecutive batches
set size: the number of messages per set
set period: timely spacing between consecutive sets In this alternative, the number of messages in the batch may be calculated by multiplying the number of sets per batch with the set size.

According to yet another embodiment the parameters configured through the configuration API 135 are at least:
batch size: total number of messages per batch
batch period: timely spacing between consecutive batches
set size: the total number of sets per batch
set period: timely spacing between consecutive sets In this alternative embodiment, the message simulator system may preferably calculate the number of messages in each set before sending the messages. The number of messages may be calculated by dividing the total number of messages per batch with the number of sets.

Figure 3:
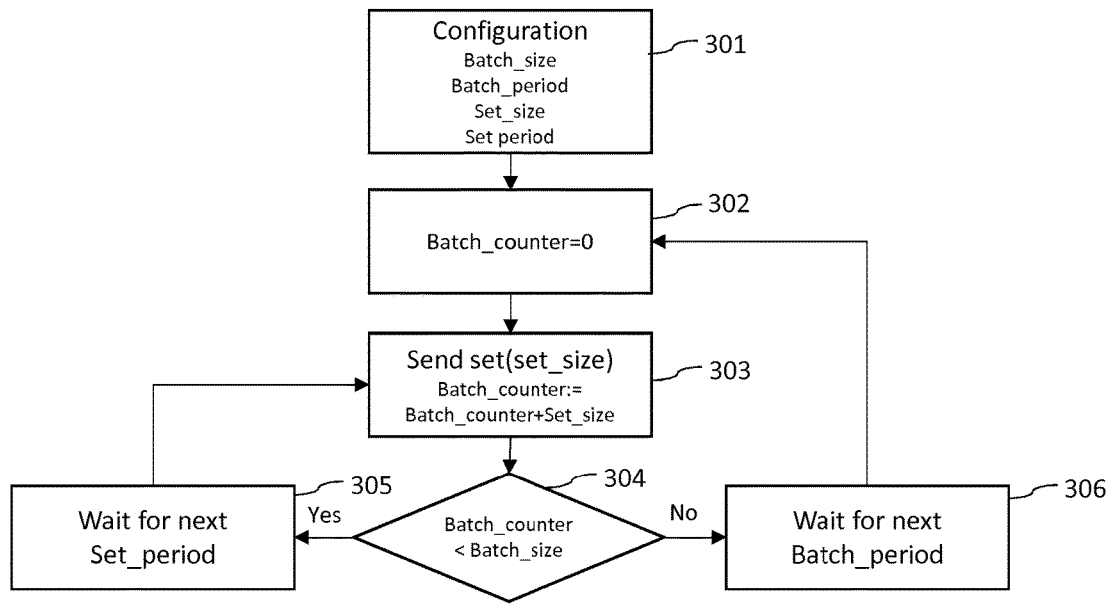
FIG. 3 describes an exemplary embodiment of a process for managing the event simulation message batch sending process.

FIG. 3 describes an exemplary embodiment of a process for managing the event simulation message batch sending process. The process begins with phase 301, receiving a set of configuration parameters. A counter (Batch_counter) keeping track of the count of messages sent is first set to zero in phase 302. First set of messages is sent by the message simulator 130 in phase 303. The Batch_counter is increased with the amount of messages in the sent set, the number corresponding to the set size. In an alternative embodiment, the batch_counter is increased with one if set size is defined to indicate total number of sets to be sent in a batch. In next phase 304, the value of the batch_counter is compared to the given batch_size parameter. If the batch_counter is less than the set batch_size, the process will wait in phase 305 until the set period of Set_period has passed, before the next set is send again (303). Phases 303, 304 and 305 loop until the batch_counter reaches the set Batch_size limit. When the check in phase 304 indicates that the preset batch size has been reached, the process proceeds to phase 306, where sending of new sets is put on halt until the set period of batch_period has passed. When the waiting period Batch_period has expired, the batch sending process will start again from phase 302.

As already indicated above, various implementations of the process in FIG. 3 may exist. Instead of counting actual number of messages, the process can be amended in various ways without departing from the scope. In example, after receiving a configuration, the system may calculate what is the number of sets of given set_size to reach the given batch_size, and the calculator may count number of sets sent rather than number of messages sent. In this case, the batch_counter may present the number of sets, and it's incremented with one after each set is sent. Batch period may be defined for example as the period between the sending of the first set of messages in a batch. Set period may be defined as the period between sending of the first message in a set. Alternatively, the batch period may define delay between sending the last set of the previous batch and sending the first set of the next batch. Similarly, the set period may define delay between sending the last message of the previous set and sending the first message of the next set.

For example, a configuration may be provided that the message simulator 130 shall send a set of 1000 messages every 15 milliseconds, and after sending a set batch of messages, say 1 million messages arranged in sets, the message simulator 130 waits for a preset period before sending another batch of messages arranged in sets. In example, the configuration may define that a total batch of 1 million messages is to be sent once per hour, with a set size of 1000 messages. To achieve a light weight functional test for the system, the amount of messages, which may be defined by the size and/or number of the batches and the sets shall be configured to a level that this message simulator data does not significantly load the system in comparison to the normal client load. In example, in a data collection system receiving normal client traffic of 35 000 messages per second, which makes a total of over 120 million messages per hour, the additional load caused by sending a batch of one million messages by the message simulator will only add roughly 0.8% to the normal load. For some purposes, even more test messages may be sent, for example 4 million or 8 million messages per hour, which would correspond to about 4% or 8% additional load in the exemplary system. The effect of the batch size can further be adjusted by adjusting the size of the sets and the periodicity of the sets. Smaller sets and longer periods between the sets lower the effective load caused to the data collection system by the message simulator originating messages.

Total number of messages in the batch and the temporal period between consecutive batches are parameters affecting to the coverage of the functional testing. On the other hand, set size and time wise spacing between consecutive sets are parameters for ensuring that the message simulator does not cause too high momentary system load to the data collection system. Sending too many messages in a set or sending the sets too fast (time wise too close to each other) may load the data collection system too much, and cause disturbance to the actual service, for example cause access problems to real clients. Thus, all parameters shall be set in a way that is suitably proportional to the normal client message volume.

The message simulator works autonomously according to its current configuration until configuration is changed through the configuration API 135. After receiving the new configuration and taking that into use, the message simulator continues working autonomously with the new configuration.

Figure 4:
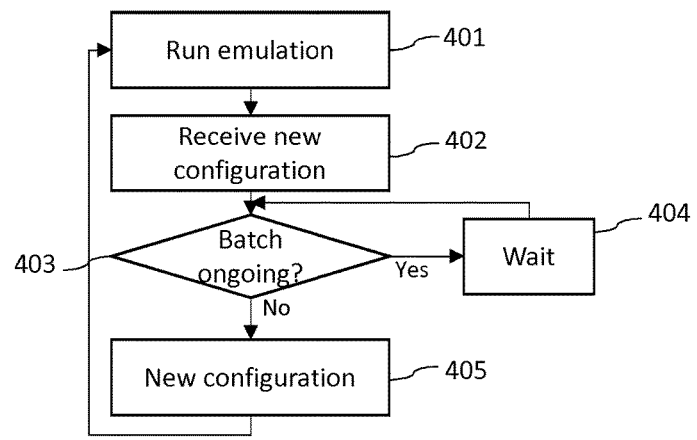
FIG. 4 illustrates an exemplary embodiment of a process flow for receiving a new configuration.

FIG. 4 describes an exemplary embodiment of a process flow for receiving a new configuration at the message simulator 130. The normally operating message emulation 401 is presented with a single phase for simplicity. It should be understood that this phase may include phases 301 to 306 as described in connection to FIG. 3. A new configuration is received through the configuration API 135 in phase 402. If an emulation round is currently running, so that a batch is currently being sent, this will be detected in phase 403. If a batch sending process is currently ongoing, the process will wait in phase 404 until the current batch has been totally sent. The waiting may be implemented in waiting for a set time and then checking again whether the current batch sending has been finished. Only after the current batch sending is finished, the new configuration is taken into use in phase 405. If there is no current batch sending ongoing during phase 403, the new configuration is taken into use immediately. Next batch of test messages will be sent in 401 using the new configuration. Intention of this kind of delay process in taking a new configuration into use ensures, that the new configuration will only be taken into use for the next message simulator run, so that any currently active run will be finalized with previous configuration, and that the currently running verification round can be finalized without disturbance. An alternative variation of the implementation of the replacing process presented in FIG. 4 may be that the process has another phase for checking a trigger condition after each batch processing round for checking whether a new configuration is to be taken into use. The trigger condition may be for example. a flag provided by the configuration platform 135, or any other method to detect a change needed in the configurations.

For achieving test results, a verification service is established, which inspects the emulator origin test messages sent through the data collection system 110. The verification service may reside in a node. The message simulator 130 adds metadata to each message sent, that can be used for validation: a batch ID that is common to the whole batch of messages, and a running sequence number making each message unique. The batch ID and sequence numbers are used by a verification service 140, responsible for verifying results of the test. The verification service preferably operates separately from the message simulator 130, in order to ensure that the two don't effect on each other. The verification service may run within the elastic data processing service 103. Verification service 140 checks whether a single instance of each message in the batch was received by the data collection system 110. If the data collection system 110 works normally, the verification service 140 can detect exactly one instance of all messages sent by the message simulator. In case there's a problem in the data collection system 110, this may appear as abnormality in the data processed by the verification service 140: some message sequence numbers may be missing, some message sequence numbers may be duplicated and/or some messages may be corrupted. In case any of these problems are identified, a warning may be given that a more thorough investigation of possible problems may be needed. Mere disorder of the received messages is not necessarily considered as an error, since variable latency caused to the messages in any part of the data collection system 110 may cause the packets to arrive into the elastic buffer, persistent storage or the elastic data processing out of original order.

Figure 5:
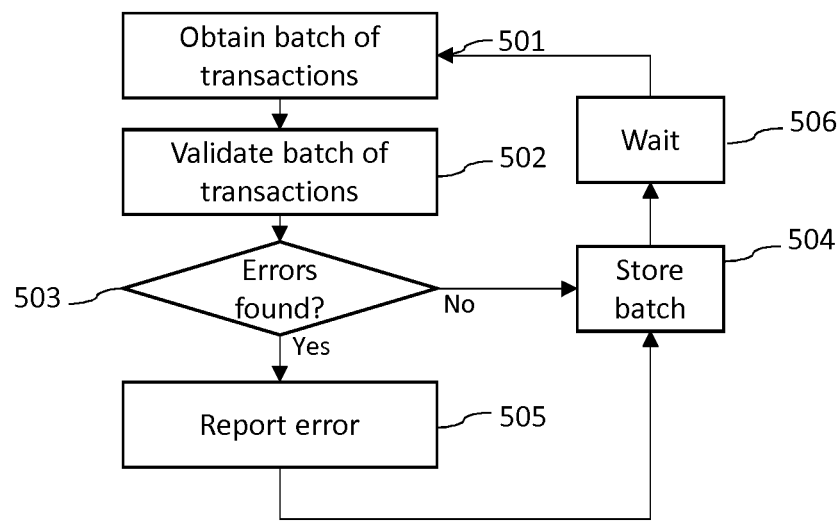
FIG. 5 illustrates an embodiment for implementing the verification process.

FIG. 5 describes an embodiment for implementing the verification process. The verification service obtains a batch of messages in phase 501, the batch containing messages corresponding to a specific batch sent by the message simulator 130, which messages were sent via the standard client interface through the production environment and were received by the data collection system. The batch may be obtained from a persistent memory, or from an elastic buffer, for instance. A new batch of messages is obtained periodically, after a reasonable delay, for example when the whole batch is expected to be available. The verification service verifies the obtained batch by inspecting the messages that may have been stored in the elastic buffer or in a persistent data storage. The validation phase 502 includes checking whether exactly one instance of each message is found in the stored batch of messages. This validation may be implemented by inspecting the metadata contained in each message in the obtained batch of messages: checking/verifying whether all messages having the same batch ID have a unique message counter value, and whether any numbers are missing from the series of message counter values. The process will make a decision in phase 503 whether the verification was successful or not. If errors were detected (for example any message counter values are missing or duplicated), an error will be reported in phase 505. In case no errors are detected, or after reporting an error, the process continues to phase 504, storing the batch for further use and phase 506, waiting for the next batch of messages to be obtained for verification. Alternatively, the storing phase may be executed before validation phase 502. Further alternative is that the error reporting phase 505 occurs only after the batch has been stored. Error reporting may indicate for example the type of errors detected in the verification, the percentage/share of success or the percentage/share of failures within the specific batch.

While the message simulator sends the batch in sets, spreading the sending temporally, and the data collection system handles each message separately, the total delay for handling different messages in the batch may vary. Different messages may traverse a different route through different nodes experiencing different delays on the way. A suitable periodicity may be set to the initiation of the verification service to match the periodicity of the message simulator batch sending period plus the delays allowed/expected for the data processing system. The processing of a batch of messages within the verification service may include combining the individual messages into a single big, serial transaction, which may also be compressed before storing it for further use.

The results of the validation in the verification service may be stored as raw batch data, as indicated with phase 504. This stored batch data may be later used for visualizing the reliability of the data collection system, in example by visually presenting statistics of the verification results in any known manner. Overall reliability of the data collection system can be estimated by the success level of subsequent message batches. By visualization, a supervisor may notice trends or abnormalities in the statistics that might otherwise remain unnoticed.

Figure 6:
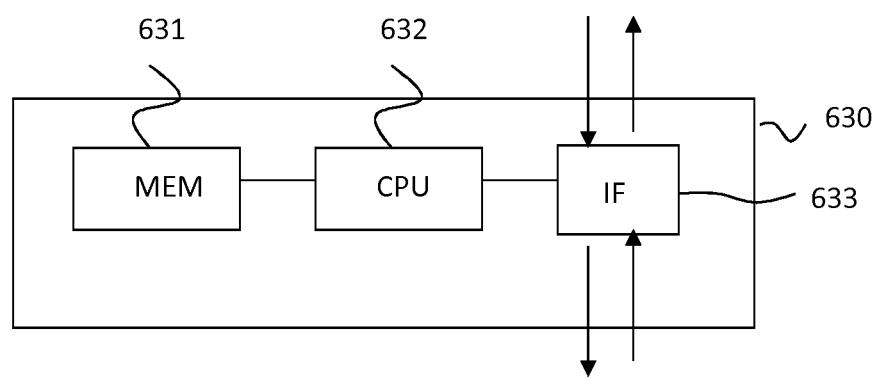
FIG. 6 illustrates an example of a node.

FIG. 6 illustrates an example of a node suitable to act as a message simulator 130 or as a verification service apparatus 140. As described earlier a node refers to a physical or virtual computational entity. The computational entity may be a device capable of handling data. The node device 630 includes a memory (MEM) 631, for storing information relating e.g. to the virtual nodes associated with it, instructions how to handle messages etc. The memory 631 may comprise volatile or non-volatile memory, for example EEPROM, ROM, PROM, RAM, DRAM, SRAM, firmware, programmable logic, etc.

The node device 630 further includes one or more processor units (CPU) 632, for processing the instructions and running computer programs and an interface unit (IF) 633, for sending and receiving messages and data. In example the node device 630 receives configuration and sends messages.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A method for functional testing of a data collection system including:

sending sets of messages in first predefined intervals to the data collection system, each of the sets including a first predefined number of messages; and sending batches of said sets in second predefined intervals to the data collection system, each of the batches including a second predefined number of said sets, wherein the first predefined number of messages in each set of messages and the first predefined interval between said sets of messages are defined so that the momentary system load caused by the messages to the data collection system does not cause disturbance to a data collection service provided to clients by the data collection system during the functional testing.

2. A method for functional testing of a data collection system of claim 1, wherein the second predefined interval is longer than the first predefined interval.

3. A method for functional testing of a data collection system of claim 1, wherein each of said messages contain a batch identification common to the messages within the specific batch and a unique message counter value.

4. A method for functional testing of a data collection system of claim 3, wherein the batch identification and the unique message counter value are placed in each message as metadata.

5. A method for functional testing of a data collection system of claim 1, the method further including:

sending the messages to the data collection system through a standard client interface, while the data collection system operates in production environment.

6. A method for functional testing of a data collection system of claim 1, the method further including:

receiving, through a configuration interface, a set of configuration data defining;

number of messages per batch periodicity of sending consecutive messages number of batches per set periodicity of sending consecutive batches.

7. A method for functional testing of a data collection system of claim 6, the method further including:

receiving a new set of configuration data;

if a batch is currently being sent to the data collection system, waiting until current batch has been sent; and sending next batch of messages with the new set of configuration data.

8. A method for functional testing of a data collection system including:

obtaining periodically, from the data collection system, a batch of messages that have been sent to the data collection system as sets of messages, wherein the sets have a first predefined number of messages, said sets of messages have been sent periodically with first predefined intervals, and each of the messages including a common batch identification and a unique message counter value; and verifying the validity of the obtained batch of messages, wherein the first predefined number of messages in each set of messages and the first predefined interval between said sets of messages are defined so that the momentary system load caused by the messages to the data collection system does not cause disturbance to a data collection service provided to clients by the data collection system during the functional testing.

9. A method for functional testing of a data collection system of claim 8, wherein:

said verifying includes checking, based on the common batch identification and the message counter values in all received messages in the obtained batch of messages, whether a single instance of each message has been received by the data collection system; and if any of the messages in the obtained batch of messages is found missing, duplicated or corrupted:

initiating a warning.

10. A method for functional testing of a data collection system of claim 8, the method further including:

storing the obtained batch of messages for further use; and utilizing stored batches of messages for visualizing the reliability of the data collection system.

11. A non-transitory computer-readable memory that contains computer readable instructions which, when executed by at least one data processor configured to operate as a message simulator, cause:

sending sets of messages in first predefined intervals to the data collection system, each of the sets including a first predefined number of messages; and sending batches of said sets in second predefined intervals to the data collection system, each of the batches including a second predefined number of said sets, wherein the first predefined number of messages in each set of messages and the first predefined interval between said sets of messages are defined so that the momentary system load caused by the messages to the data collection system does not cause disturbance to a data collection service provided to clients by the data collection system during the functional testing.

12. A non-transitory computer-readable memory according to claim 11, wherein the second predefined interval is longer than the first predefined interval.

13. A non-transitory computer-readable memory according to claim 11, wherein causing including in each of said messages:

a batch identification common to the messages within the specific batch; and a unique message counter value.

14. A non-transitory computer-readable memory according to claim 13, wherein the batch identification and the unique message counter value is included in each message as metadata.

15. A non-transitory computer-readable memory according to claim 11, further causing:

sending the messages into the data collection system through a standard client interface, while the data collection system operates in production environment.

16. A non-transitory computer-readable memory according to claim 11, further causing:

receiving, through a configuration interface, a set of configuration data defining number of messages per batch periodicity of sending consecutive messages number of batches per set periodicity of sending consecutive batches.

17. A non-transitory computer-readable memory according to claim 16, further causing:

receiving a new set of configuration data;

if a batch is currently being sent to the data collection system, waiting until current batch has been sent; and sending next batch of messages with the new set of configuration data.

18. A non-transitory computer-readable memory that contains computer readable instructions which, when executed by at least one data processor configured to execute a verification service, cause:

obtaining periodically, from the data collection system, a batch of messages that has been sent to the data collection system as sets of messages, wherein the sets have a first predefined number of messages, said sets of messages have been sent periodically with first predefined intervals, and each message including a common batch identification and a unique message counter value; and verifying the validity of the received batch of messages, wherein the first predefined number of messages in each set of messages and the first predefined interval between said sets of messages are defined so that the momentary system load caused by the messages to the data collection system does not cause disturbance to a data collection service provided to clients by the data collection system during the functional testing.

19. A non-transitory computer-readable memory according to claim 18, further causing:

checking, based on the common batch identification and the message counter values in all messages in the obtained batch of messages, whether a single instance of each message has been received by the data collection system; and if any of the messages in the obtained batch of messages is found missing, duplicated or corrupted:

initiating a warning.

20. A non-transitory computer-readable memory according to claim 18, further causing:

storing the obtained batch of messages for further use utilizing stored batches of messages for visualizing the reliability of the data collection system.

\* \* \* \* \*